US010668871B2

United States Patent
Yon

(10) Patent No.: US 10,668,871 B2
(45) Date of Patent: Jun. 2, 2020

(54) RETAINING DEVICE, IN PARTICULAR FOR REMOVABLY CONNECTING VEHICLE BODY PARTS

(71) Applicant: ILLINOIS TOOL WORKS INC., Glenview, IL (US)

(72) Inventor: Fulvio Pacifico Yon, Donnas (IT)

(73) Assignee: ILLINOIS TOOL WORKS INC., Glenview, IL (US)

( * ) Notice: Subject to any disclaimer, the term of this patent is extended or adjusted under 35 U.S.C. 154(b) by 443 days.

(21) Appl. No.: 15/508,579

(22) PCT Filed: Sep. 15, 2015

(86) PCT No.: PCT/US2015/050156
§ 371 (c)(1),
(2) Date: Mar. 3, 2017

(87) PCT Pub. No.: WO2016/069125
PCT Pub. Date: May 6, 2016

(65) Prior Publication Data
US 2017/0240121 A1    Aug. 24, 2017

(30) Foreign Application Priority Data
Oct. 31, 2014  (IT) .............. TO2014A0901

(51) Int. Cl.
*B60R 13/02* (2006.01)
*F16B 5/06* (2006.01)
*F16B 21/08* (2006.01)

(52) U.S. Cl.
CPC ........ *B60R 13/0206* (2013.01); *F16B 5/0642* (2013.01); *F16B 21/086* (2013.01); *Y10T 403/75* (2015.01)

(58) Field of Classification Search
CPC .. B60R 13/0206; F16B 5/0084; F16B 5/0088; F16B 5/0092; F16B 5/0642;
(Continued)

(56) References Cited

U.S. PATENT DOCUMENTS 5,658,110 A  *  8/1997  Kraus .................. F16B 21/086
                                                        411/510
6,305,055 B1    10/2001  Castro
(Continued)

FOREIGN PATENT DOCUMENTS

| EP | 0543388 | 5/1993 | |
|----|---------|--------|---|
| FR | 911056 A * | 6/1946 | ............ F16B 21/086 |
| GB | 1319961 | 6/1973 | |

OTHER PUBLICATIONS

PCT, International Search Report and Written Opinion, International Application No. PCT/US2015/050156, dated Dec. 16, 2015, 12 pages.

*Primary Examiner* — Josh Skroupa
(74) *Attorney, Agent, or Firm* — Thompson Hine LLP

(57) ABSTRACT

A retaining device (1) including: a box-like element (5) designed so that it can be inserted so as to pass through a perforation (4) of parts to be connected; a pivot (8) mounted inside the box-like element rotatably about an axis (A) of symmetry thereof and provided with a head (9) arranged on the outside of the box-like element; and a pair of elastically deformable wings (10) mounted in an angularly integral manner on the pivot (8) and projecting from opposite sides transversely so as to jut out through a pair of opposite through-windows (11) formed in a side wall (12) of the box-like element (5) and designed to assume an elastically deformed or retracted configuration, in which they are fully folded up inside the box-like element (5).

13 Claims, 7 Drawing Sheets

(58) Field of Classification Search
CPC ...... F16B 21/02; F16B 21/086; Y10T 403/59; Y10T 403/591; Y10T 403/608; Y10T 403/75
USPC .......................... 403/321, 322.1, 330, 408.1
See application file for complete search history.

(56) References Cited

U.S. PATENT DOCUMENTS

| 8,807,900 | B2* | 8/2014 | Ramsauer | ............... | E05B 9/084 |
| | | | | | 411/347 |
| 2005/0019132 | A1 | 1/2005 | Diaz | | |
| 2012/0227226 | A1* | 9/2012 | Sasaki | ................... | F16B 21/086 |
| | | | | | 24/703.1 |

* cited by examiner

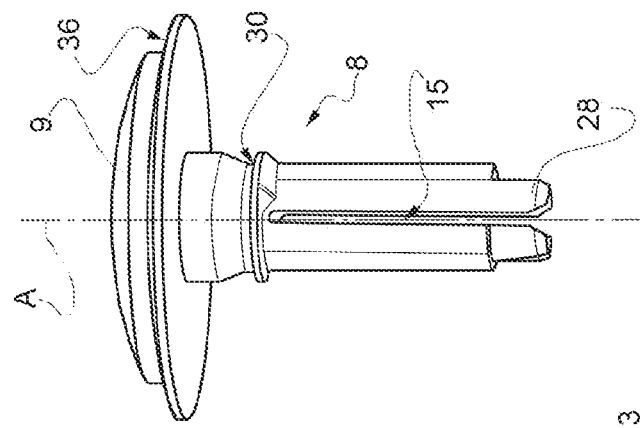
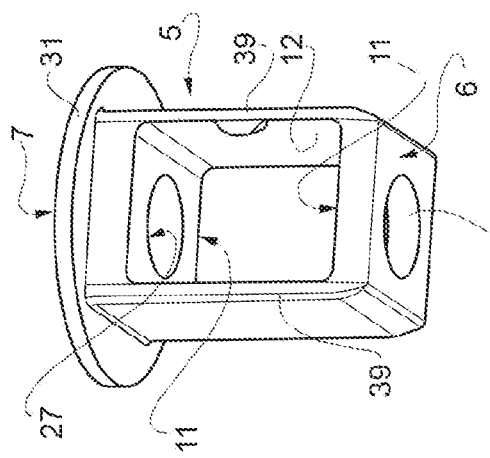
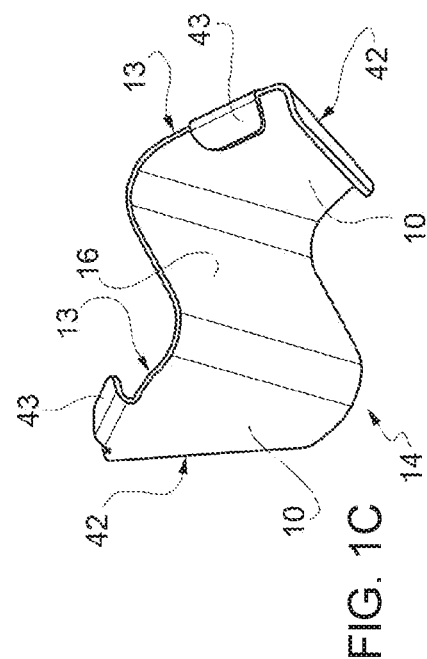
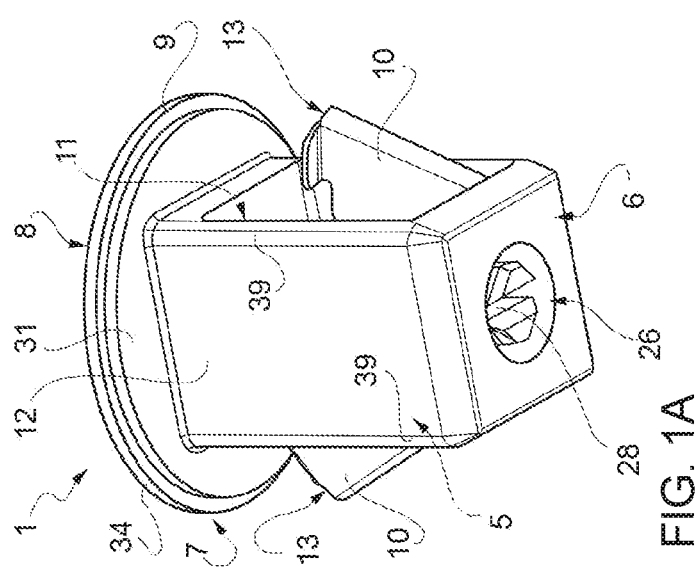

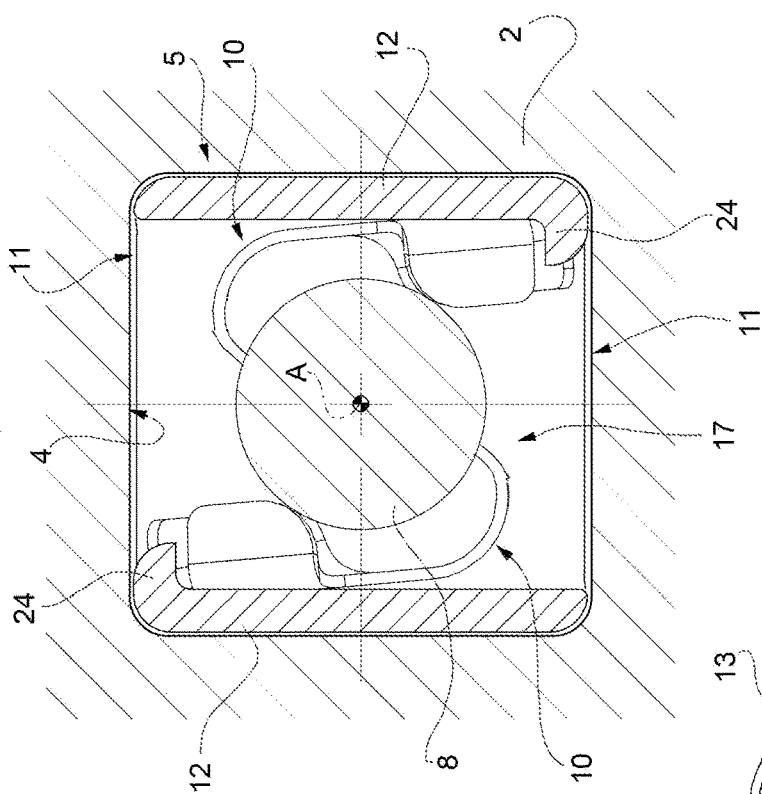
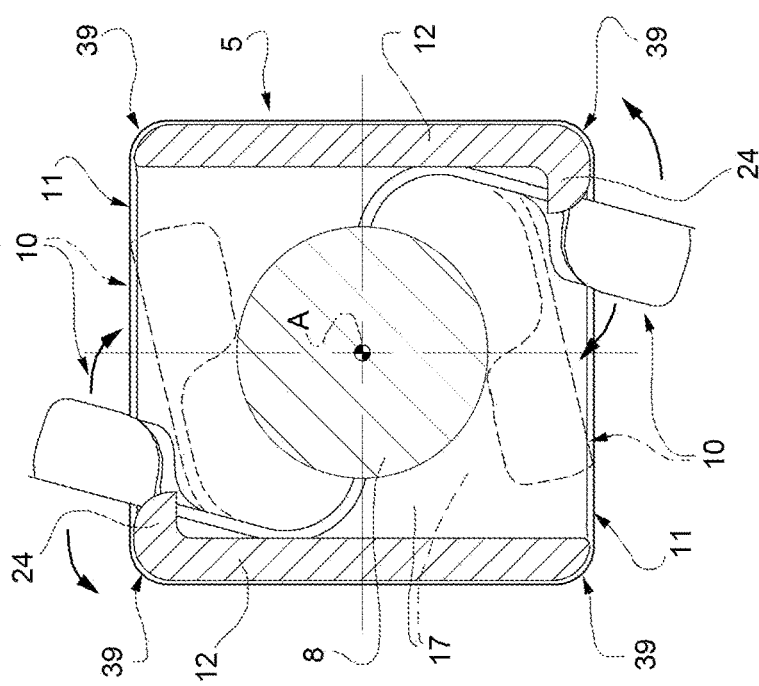
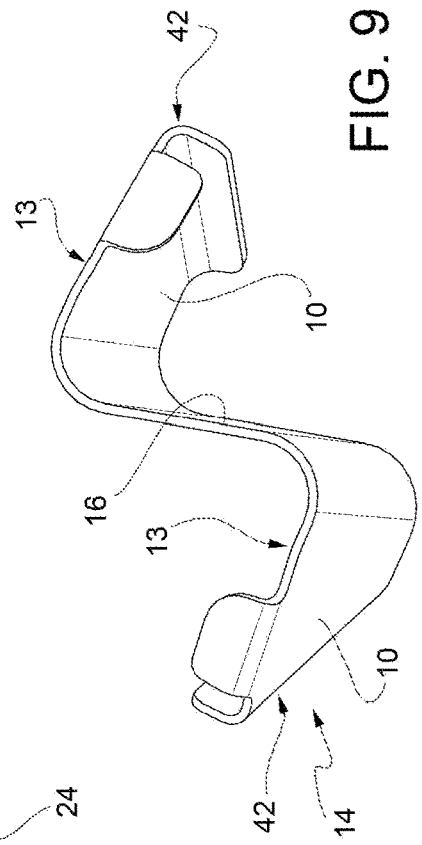

FIG. 10
FIG. 11
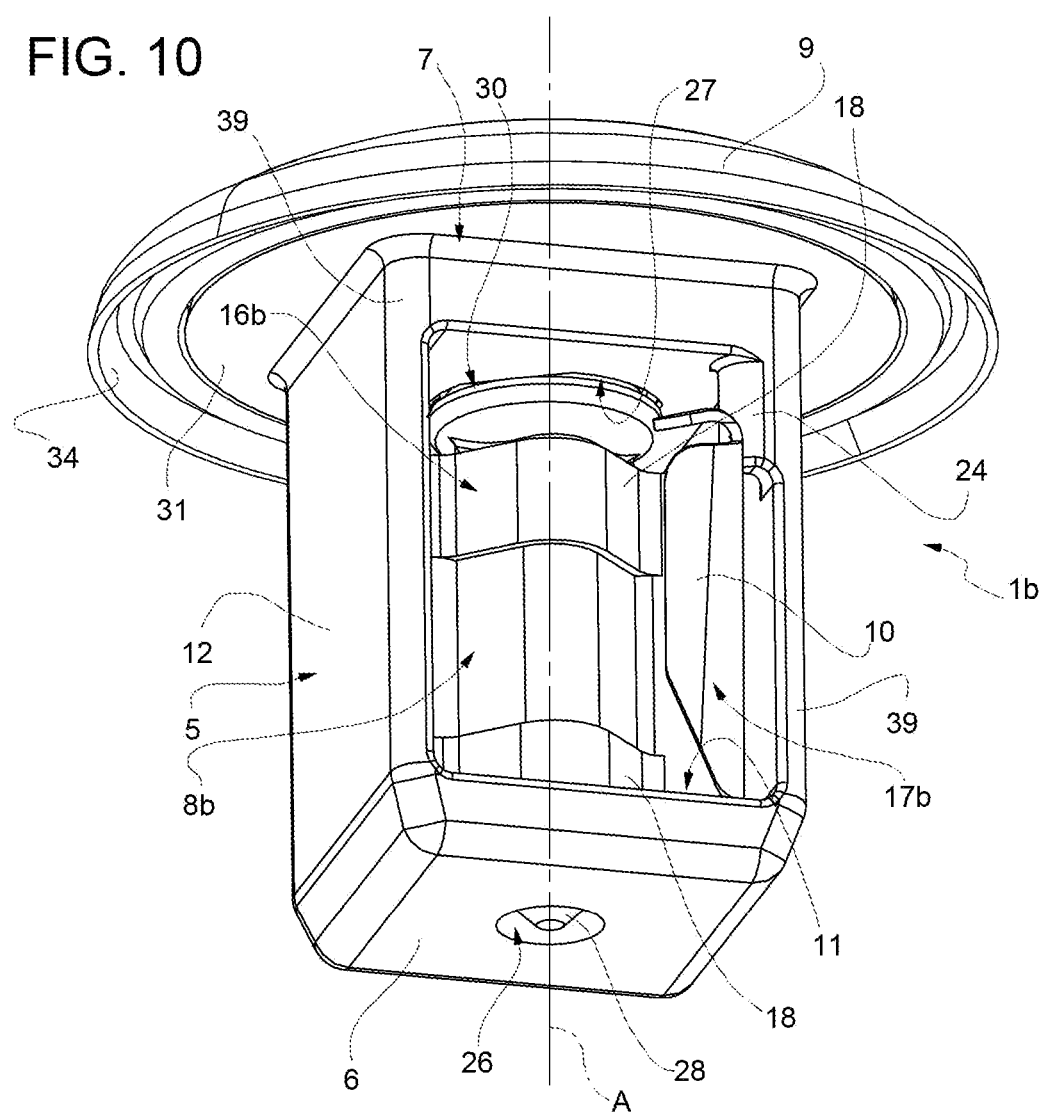
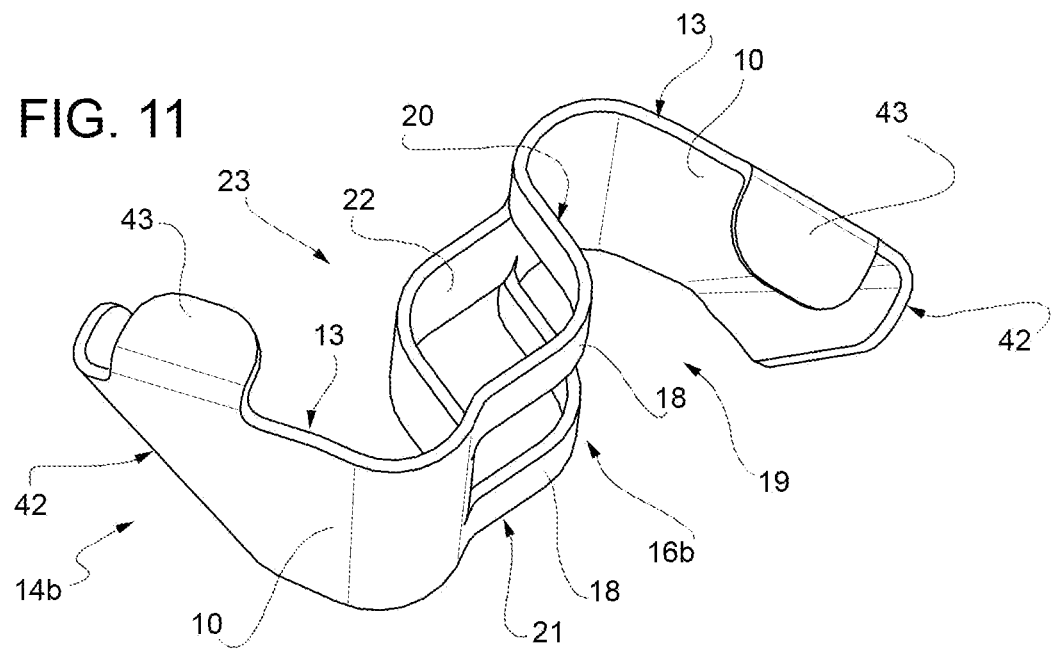

RETAINING DEVICE, IN PARTICULAR FOR REMOVABLY CONNECTING VEHICLE BODY PARTS

TECHNICAL FIELD

The present invention relates to a retaining device, in particular for connecting together vehicle body parts, in particular for connecting a finishing element to a vehicle body in a removable manner, namely with the possibility of performing repeated assembly and disassembly without the risk of damage.

BACKGROUND

It is known that, in the motor-vehicle sector, in order to achieve the fixing together of body parts, for example the fixing of an internal finishing panel to the frame of a door or side of the passenger compartment of a vehicle, retaining devices of various types, e.g. snap-engaging or bayonet type, are used.

However, these retaining devices are not suitable for allowing disassembly of the parts connected by them without the risk of causing possible damage and/or without causing the breakage of the retaining device, in particular those devices of the type able to be assembled by means of snap-engagement.

The only known retaining device which can be reused and is suitable for allowing also frequent assembly and disassembly without the risk of damage is the screw. However, connecting together body parts by means of screws would be costly and would slow down the operations of assembly of the parts to be joined together owing to the time needed to perform screwing of the screws.

SUMMARY

It is an object of the present invention to overcome the drawbacks of the present state of the art by providing a retaining device which has a simple, reliable, compact and relatively low-cost design, allowing the fixing together of two parts, in particular two vehicle body parts, rapidly and in a manner allowing easy disassembly without the risk of damaging the parts fixed by them, and which can be used again after disassembly, thus being advantageously able to replace screws.

The present invention therefore relates to a retaining device as defined in the accompanying claims.

BRIEF DESCRIPTION OF THE DRAWINGS

Further characteristic features and advantages of the invention will become clear from the following description of three possible embodiments of the invention, provided purely by way of a non-limiting example, with reference to the accompanying drawings in which:

FIG. 1A shows a perspective view of a retaining device according to a first embodiment of the invention, shown assembled, and FIGS. 1B-1D show an exploded perspective view of its components;

FIGS. 7 and 8 show respective schematic cross-sectional plan views of the retaining device according to the invention, illustrating operation thereof;

FIG. 9 shows a perspective three-quarters view, on a smaller scale, from above, of another component of the retaining device according to FIG. 1A;

FIGS. 10 and 11 show respective perspective views of a second embodiment of the retaining device according to the invention and a component thereof.

DETAILED DESCRIPTION

Figure 2:
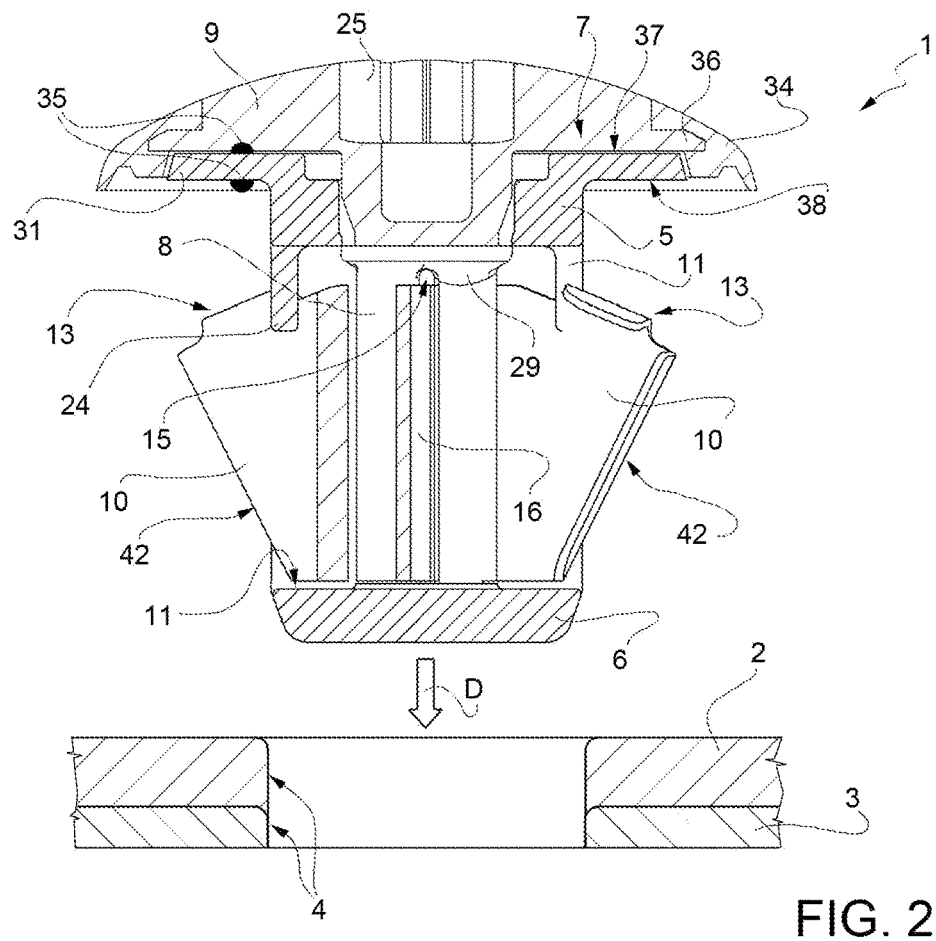
FIGS. 2, 3 and 4 show respective longitudinal orthogonal views, in staggered cross-section, of the retaining device according to FIG. 1A in three different working positions with respect to a pair of parts to be connected.

With reference to FIGS. 1A-1D and FIGS. 2 to 8, 1 denotes overall a retaining device, in particular for connecting together two vehicle body parts 2,3 provided with corresponding through-perforations 4. The body parts 2,3 may be of any kind and in the example shown consist of a synthetic finishing panel 2 and a sheet-metal body frame 3. The perforations 4 may be round, but may also have another shape.

The retaining device 1 comprises a box-like element or "cage" 5 which is designed so that it can be inserted so as to pass through the perforation 4 of the parts to be connected 2,3 and has a first end 6 directed in a direction D (FIGS. 2 and 3) for inserting during use the retaining device 1 inside the through-perforation 4 of the parts 2,3 to be connected, and a second end 7, opposite to the first end.

The retaining device 1 further comprises a pivot 8 mounted inside the box-like element 5 rotatably about an axis of symmetry A thereof and provided with a head 9 arranged on the outside of the box-like element 5, at the second end 7 of the box-like element 5.

The retaining device 1 comprises finally a pair of elastically deformable wings 10 (FIG. 1A) which, in FIGS. 1A and 2, are shown in a configuration where they project laterally jutting out from the box-like body 5.

In particular, the elastically deformable wings 10 are mounted in an angularly integral manner on the pivot 8 and, principally, extend longitudinally, i.e. they extend in a direction parallel to the axis A of the pivot 8 from which they project on opposite sides transversely jutting out, extending also, secondarily, transversely relative to the axis A.

Figure 3:
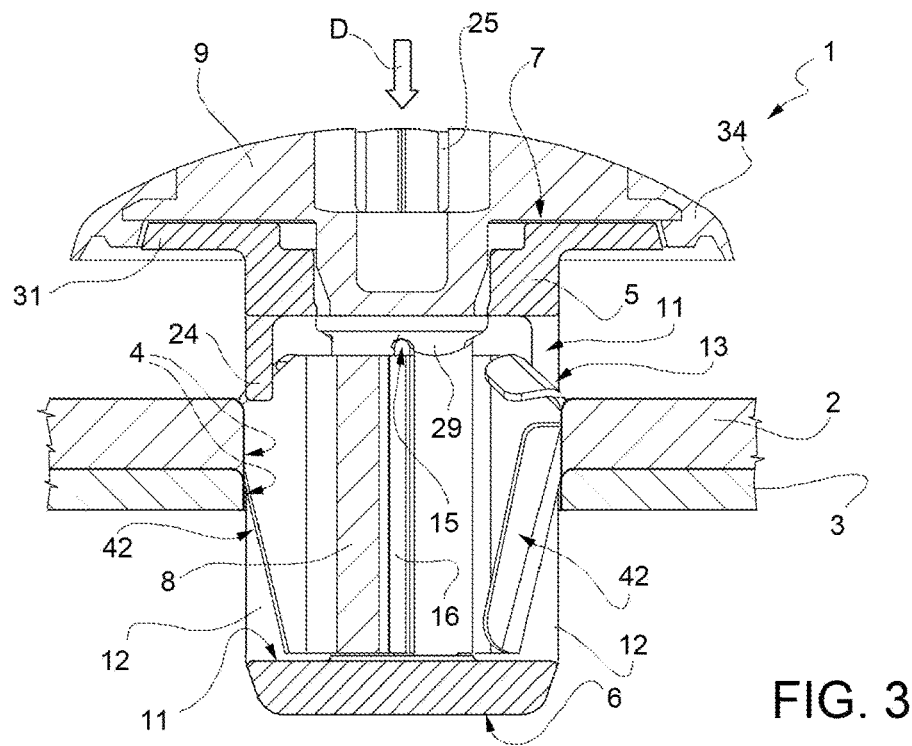

According to an aspect of the invention, the wings 10 are formed so as to be suitable for assuming selectively two different configurations and, precisely, an undeformed or extended configuration, shown in FIGS. 1A, 2, 4 and 7, and an elastically deformed or retracted configuration, shown in FIGS. 3 and 8 in continuous lines and in FIG. 7 in broken lines.

In the undeformed or extended configuration, the wings 10 have an L-shaped form in a plane perpendicular to the axis of symmetry A of the pivot 8 (plane of the sheet in FIGS. 7,8) and project radially jutting out from the box-like element 5, through a pair of opposite through-windows 11 formed through a side wall 12 of the box-like element 5.

In the elastically deformed or retracted condition, on the other hand, the wings 10 are entirely folded up inside the box-like element 5, assuming a U-shaped form in a plane perpendicular to the axis of symmetry A of the pivot 8 (plane of the sheet in FIGS. 7,8).

Figure 6:
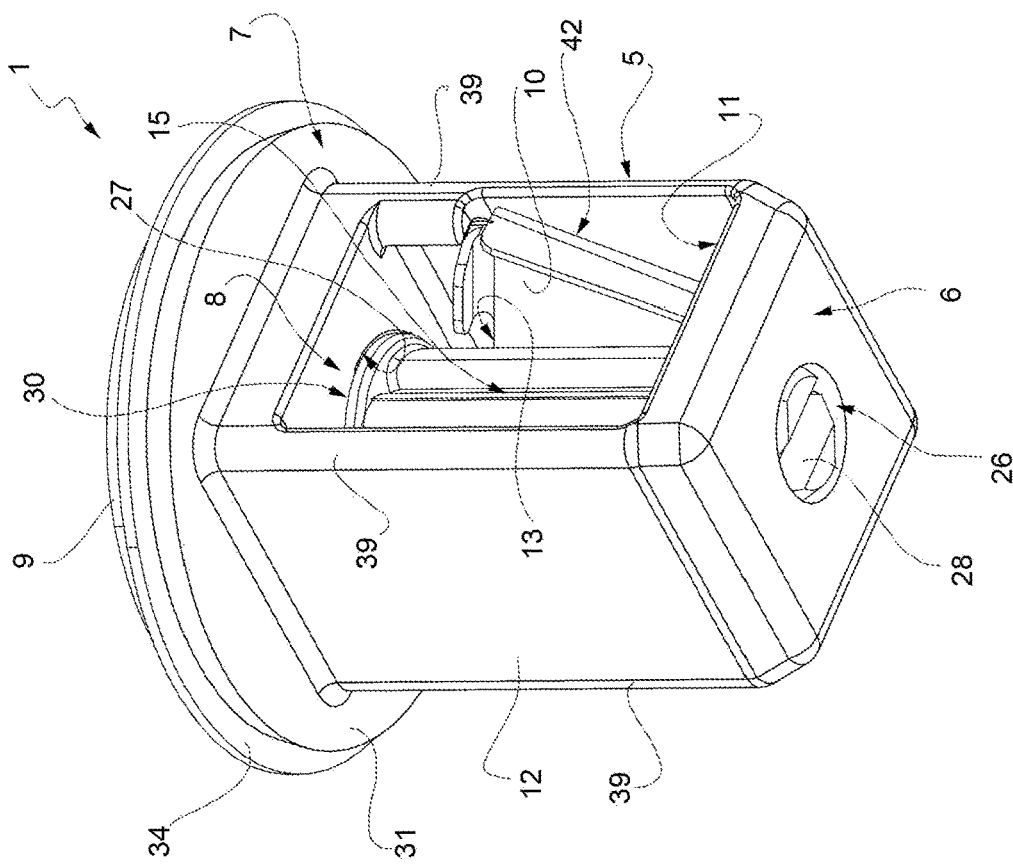
FIG. 6 shows the same perspective view as in FIG. 5 of the retaining device according to FIG. 1A in the assembled condition.
Figure 5:
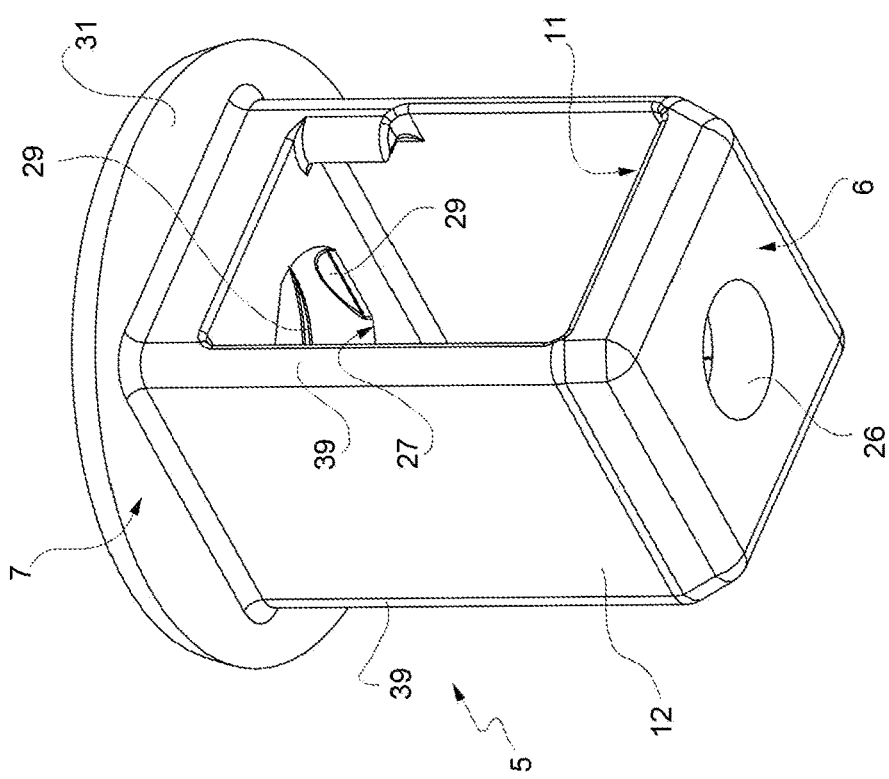
FIG. 5 shows a perspective three-quarters view from below of a component of the retaining device according to FIG. 1A.

The pivot 8 is selectively rotatable between a first and a second angular position; in the first angular position, shown in FIGS. 1A and 2 to 4 and 7, the wings 10 are situated facing the pair of opposite through-windows 11 of the box-like element 5; in the second angular position, shown in FIGS. 6 and 8, the wings 10 cooperate making contact with the side wall 12 of the box-like element 5 so as to be forced to assume the deformed or retracted configuration.

In combination with that described hitherto, the wings 10 are configured/designed to snap-engage, when the pivot 8 is in the first angular position (FIG. 3), inside the through-perforations 4 of the parts 2,3 to be connected, so as to clamp the latter together (FIG. 4) between the head 9 of the pivot 8 and respective transversal rims 13 of the wings 10 directed towards the second end 7 of the box-like element 5.

For this purpose, the pivot 8 and the wings 10 are designed so that, between the head 9 and the rims 13, there is always a predefined axial play which is generally substantially equal to the combined thickness of the two parts 2,3 to be joined together. Basically, respective points closer to the end 7 of the rims 13 are located at a distance from the head 9, measured along the axis A, which is substantially of the same order of magnitude as the sum of the thicknesses, measured again along the axis A, of the parts 2,3 to be joined together. If necessary, the predefined axial play may be slightly smaller than the combined thickness of the two parts 2,3 to be joined together, if the two parts must be lightly pressed together. Any small variations in thickness or dimensional variations are in any case compensated for, as will be seen, by the elasticity of the wings 10.

According to a non-limiting example shown in FIGS. 1A-1D and 2 to 9, the wings 10 form part of a single metallic element 14 which is elastically deformable and mounted in an angularly integral manner on the pivot 8 and is made of sheet metal cut and bent so as to assume an overall S-shaped form.

In particular, the pivot 8 has a transverse slot 15 passing from side to side (i.e. transversely with respect to the axis A) and extending longitudinally, parallel to the axis A of the pivot 8, and the metallic elastic element 14 has a flat central portion 16 which connects together the wings 10 and which engages passing through the transverse slot 15 of the pivot 8 so as to form together with the latter a single rotating unit, indicated schematically by 17 in FIGS. 7 and 8.

With reference to FIGS. 10 and 11, where details similar to or the same as those already described are indicated for the sake of simplicity by means of the same reference numbers, these show a variant 1b of the device 1, which is identical to that already described except for the constructional design of the rotating unit 17, which is replaced by a rotating unit 17b composed of a pivot 8b, which has a prismatic shape and which again comprises a head 9, and by a metallic elastic element—again made by shearing a metal sheet—which comprises the two opposite wings 10 and a central portion 16b which connects together the wings 10 and which is configured as a radially deformable elastic prismatic sleeve which is fitted by means of interference onto the prismatic pivot 8b.

In particular, the central portion 16b of the metallic elastic element 14b comprises: a pair of first straps 18 folded in an L shape radially externally on a same first side 19 of the metallic elastic element 14b and defining first and second opposite axial ends 20,21 of the central portion 16b of the metallic elastic element 14b (FIG. 11); and a second strap 22 folded in an L shape radially externally on a second side 23 of the metallic elastic element 14b opposite to the first side 19, which second strap 22 is arranged axially between the first straps 18, on the opposite side thereto.

In both the embodiments described, the box-like element 5 of the devices 1 and 1b is provided, laterally at each through-window 11 and at the second end 7, with a lateral tooth 24 designed to cooperate by means of snap-engagement, during rotation of the pivot 8,8b towards the second angular position, with a corresponding wing 10 as the latter moves towards the deformed or retracted configuration for locking by means of snap-engagement the pivot 8,8b in the second angular position.

The lateral teeth 24 are also designed to allow disengagement of the wings 10 when the pivot 8,8b is rotated in the opposite direction towards the first angular position.

In the examples shown and with particular reference to FIGS. 7 and 8, the wings 10 are designed to assume the deformed or retracted configuration both in the first and in the second angular position of the pivot 8,8b. In the first angular position, shown in FIG. 7, they assume the deformed configuration (shown in broken lines in FIG. 7) as a result, as will be seen, of cooperation of the wings 10 with the perimetral edge of the perforations 4 which, during introduction of the box-element 5 into the perforations 4 in the direction D, forces the wings 10 to fold up elastically (FIG. 3) and then click out again into the extended configuration (FIG. 4) as soon as introduction of the box-like element 5 into said perforations 4 has been completed.

In order to remove the device 1,1b from the parts 2,3 and then extract it from the perforations 4 it is sufficient to rotate the pivot 8,8b towards the second angular position, in the example shown by means of an anti-clockwise rotation, so that the wings 10 are forced to cooperate against the teeth 24 which are arranged in a diametrically opposite position with respect to the axis A and jutting out into the windows 11, one for each window 11, in the direction of rotation of the pivot 8,8b towards the second angular position, in the example shown in the anti-clockwise direction, indicated by the arrows in FIG. 7.

In this way the wings 10 intercept the teeth 24 and, as a result of rotation of the pivot 8,8b, are flexed towards the retracted position until they click over the teeth 24 when the pivot 8,8b reaches the second angular position, which is rotated through 90° with respect to the first position. The wings 10 are therefore locked by means of snap-engagement inside the box-like element 5 (FIG. 8) in the bent or retracted configuration, resting against the side wall 12, thus also locking by means of snap-engagement the pivot 8,8b in this second angular position. Since in this position the wings 10 no longer interfere with the edges of the perforations 4, the entire device 1,1b may be extracted from them, releasing the two parts 2,3 to be joined together.

In order to fix again the parts 2,3 it is merely required to introduce again the device 1,1b into the perforations 4 when the pivot 8,8b is still angularly locked in the second angular position by the teeth 24. Then, a rotation is applied to the pivot 8,8b in the opposite direction, in the example shown in the clockwise direction, so as to push the wings 10 against the teeth 24 which are shaped so as to cooperate with the wings 10 and force them to flex again towards the pivot 8,8b by just the amount needed for them to click over again the teeth 24. The wings 10 are at this point free, with continued rotation of the pivot 8,8b, to unfold as a result of the elastic effect towards the extended configuration, through the windows 11, cooperating again with the edges of the perforations 4 and clamping together again the parts 2,3 between their transversal rims 13 and the head 9.

Figure 4:
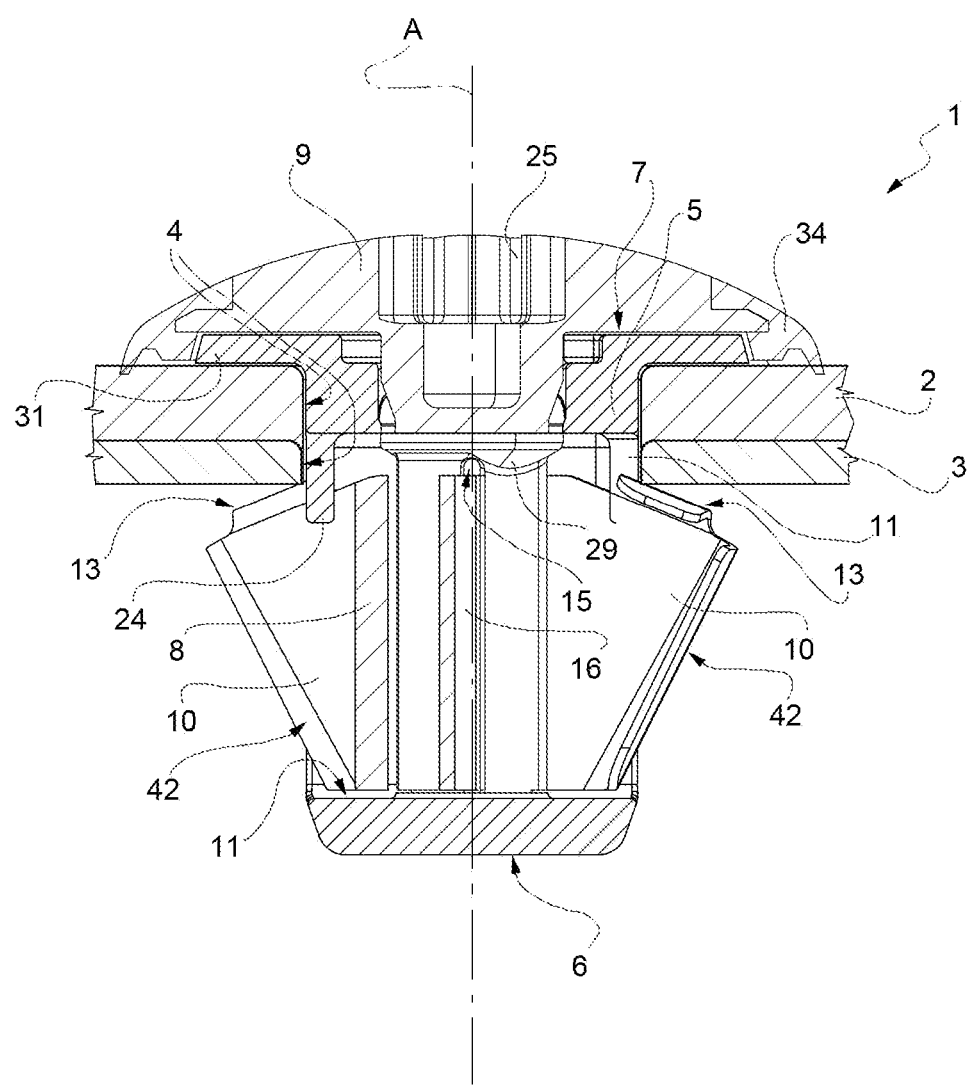

In order to allow rotation of the pivot 8,8*b* while applying at the same time a torque sufficient to allow the teeth 24 to be passed over, overcoming the resistance offered by the bending force induced on the wings 10, the head 9 is provided with means for receiving a tool, in the examples shown an Allen wrench seat 25 (FIGS. 2,3,4).

In order to allow the pivot 8,8*b* to be introduced and supported, the box-like element 5 is also provided at the first end 6 and the second end 7 with, respectively, a first through-hole 26 and a second through-hole 27 coaxial with the axis A of the pivot 8,8*b*.

The second hole 27 is designed to allow the introduction of the pivot 8,8*b* and the wings 10 into the box-like element 5 through the second end 7, while the first hole 26 is smaller and cooperates with an end 28 of the pivot 8,8*b* opposite to the head 9 so as to guide, during use, rotation thereof about the axis A; the second hole 27 is furthermore provided with circumferential projecting parts 29 (FIGS. 2-4 and 5) which are designed to snap-engage with radial play inside an annular groove 30 of the pivot 8,8*b* formed in the region of the head 9 so as to lock by means of snap-engagement the pivot 8,8*b* rotatably inside the box-like element 5.

The second end 27 of the box-like element 5 finally is provided with a radially projecting flange 31 arranged facing and in contact with the head 9 of the pivot 8,8*b* so as to lock axially the box-like element 5 inside the perforations 4 in the direction of insertion D.

Figure 13:
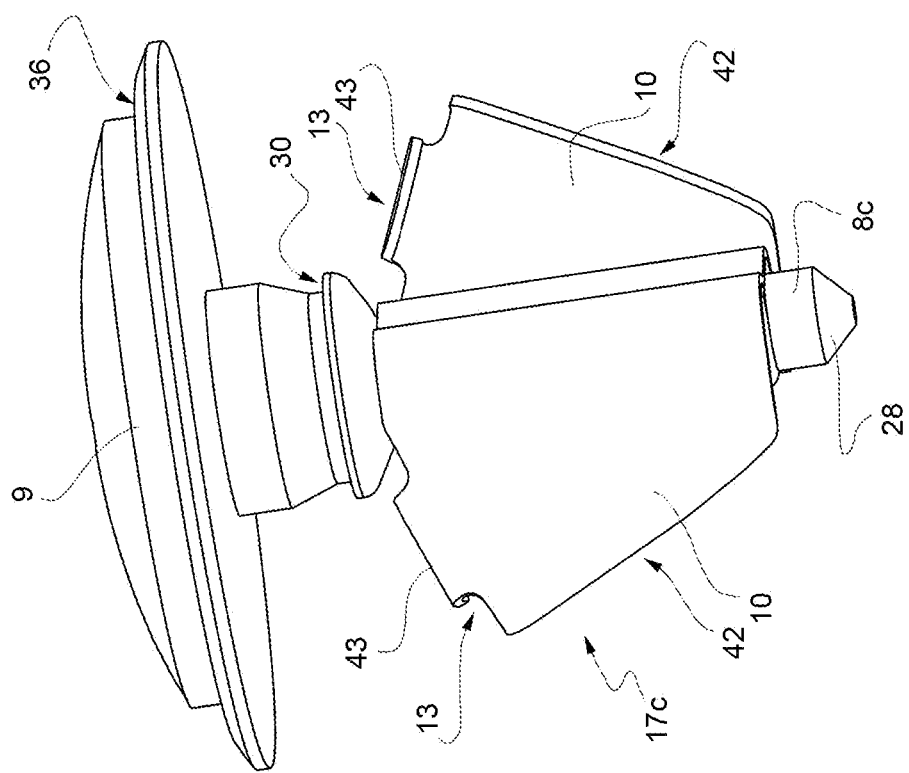
FIGS. 12 and 13 show respective perspective views of a third embodiment of the retaining device according to the invention and a component thereof.
Figure 12:
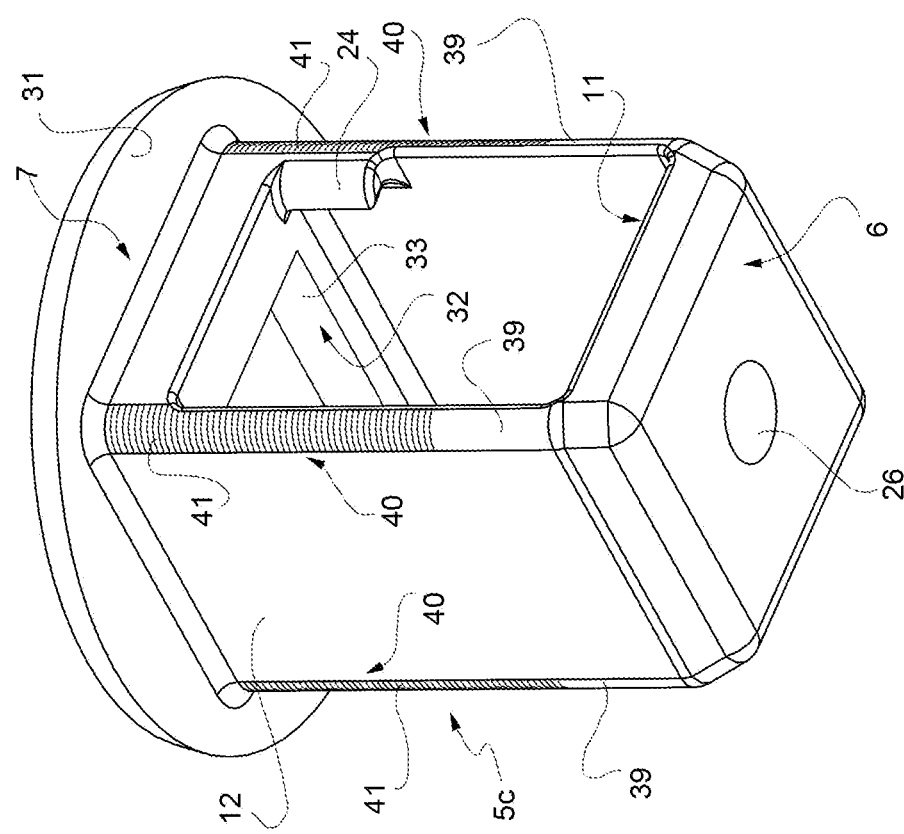

With reference now to FIGS. 12 and 13, where the details similar to or the same as those already described are indicated for the sake of simplicity by the same reference numbers, the wings 10 are formed integrally as one piece with a pivot 8*c*, preferably by means of moulding from a synthetic plastic material and are configured as a lamina, so as to form together with the pivot 8*c*, also obtained by means of moulding from a synthetic plastic material, a single self-supporting rotating unit 17*c* made as one piece and replacing in the device 1 in FIG. 1A the composite rotating unit 17.

According to this variant, in order to allow insertion of the entire rotating unit 17*c* formed by the pivot 8*c* and by the wings 10 formed as one piece with the latter, the box-like element 5 of the device 1 is replaced with a box-like element 5*c* (FIG. 12) which is identical, but provided at its second end 7 with a quadrangular aperture 32 for introducing the pivot 8*c* into the box-like element 5*c*; a perimetral edge 33 of the quadrangular aperture 32 is in particular designed chamfered so as to cooperate with the wings 10 during introduction of the pivot 8*c* into the box-like element 5*c* through the aperture 32, so as to cause folding up thereof into the deformed or retracted configuration. As soon as the end 28 of the pivot 8*c* reaches the hole 26 the wings 10 no longer cooperate with the edge 33 and click into the extended configuration, thus making the device operative.

In the examples shown, the head 9 of the pivot 8,8*b*,8*c* and/or the flange 31 of the box-like element 5,5*c* are provided with respective sealing gaskets 34,35 which are designed to enable the device 1,1*b* to close off in a fluid-tight manner the through-perforation 4 of the body parts 2,3 to be joined together.

With reference to FIGS. 1D and 13, where the pivot 8,8*c* is shown separately without gaskets, the head 9 is provided with a step-shaped perimetral edge 36 which receives a sucker-like annular gasket 34 directed towards the flange 31 and configured so as to house inside it said flange 31 so as to be able to cooperate during use with the body part 2 all the way around the perforation 4, sealing it.

In addition or as an alternative to the presence of the gasket 34, the flange 31 (FIG. 2) may be provided with a pair of annular gaskets 35, of the O-ring type, which are co-moulded with the box-like element 5,5*c*, which is preferably made by means of moulding from a synthetic plastic material. The annular gaskets 35 are fixed to corresponding opposite faces 37 and 38 of the flange 31, in a radial position outside of the lateral wall 12 of the box-like element 5,5*c*. In this way, the gasket 35 of the face 37 cooperates making contact with the head 9 of the pivot 8,8*b*,8*c*, preventing the entry of contaminants towards the hole 27 or 32, while the gasket 35 of the face 38 during use cooperates with the body part 2 around the perforation 4, sealing it in a fluid-tight manner.

In the examples shown, the box-like element 5,5*c* is prismatic and is made of synthetic plastic material. It has respective rounded edges 39 parallel to the axis A of the pivot 8,8*b*,8*c*. In accordance with that shown schematically in FIG. 12, the edges 39 are lined, at least along a stretch 40 arranged in the region of the second end 7, with elastomeric pads 41. In this way the pads 41 during use come into contact with the perimetral edge of the perforations 4, preventing the generation of bothersome noise owing to any play due to the machining tolerances.

In all the embodiments described, the wings 10, irrespective as to whether they form part of a metallic element 14,14*b* or whether they are made of synthetic plastic material formed as one piece with the pivot 8*c*, are provided with opposite longitudinal rims 42 facing towards the first end 6 of the box-like element 5,5*c* and arranged obliquely with respect to the axis A of symmetry of the pivot 8,8*b*,8*c* so as to converge towards the axis A at the ends 6 of the box-like element 5,5*c* and 28 of the pivot 8,8*b*,8*c*. The rims 42 therefore move closer, in a direction transverse to the axis A, towards the end 28 as they move closer from said axis A.

The longitudinal rims 42 are designed to be able to cooperate, during use, with the through-perforations 4 of the parts 2,3 to be connected so as to cause, during insertion of the box-like element 5,5*c* inside the perforations 4, folding of the wings 10 inside the box-like element 5,5*c* and through the through-windows 11, towards the elastically deformed or retracted configuration.

In particular, the longitudinal rims 42 of the wings 10 are folded in an L shape in opposite circumferential directions so as to be able to cooperate slidingly on the edges of the perforations 4; furthermore, their oblique arrangement with respect to the axis A forms a receiving surface for the introduction of the wings 10 into the perforations 4 since the transverse dimension of the wings 10 along the transversal rims 13 is greater than the maximum transverse dimension of the perforations 4, while the transverse dimension of the wings 10 at the end 28 of the pivot 8,8*b*,8*c* is much smaller than the maximum transverse dimension of the perforations 4.

The L-shaped form of the longitudinal rims 42 facilitates furthermore the passing movement over the teeth 24 when the pivot 8,8*b*,8*c* is rotated from the second angular position towards the first angular position.

The transversal rims 13 of the wings 10 join the longitudinal rims 42 to the body of the pivot 8,8*b*,8*c* and are each provided with a flap 43 folded in an L shape on the same side as the longitudinal rim 42 of the same wing 10. The flap 42 of each wing 10 is designed to cooperate making bearing contact, during use, with the perimetral edge of the through-perforations 4 of the parts 2,3 to be joined together and enables better distribution, during use, of the pressures acting on the parts 2,3 so as not to damage them.

Also the transversal rims 13 with the associated flaps 43 are inclined towards the end 28 relative to the axis A, in particular so as to move closer towards the end 28 as they move away from the axis A.

They therefore allow the wings 10 to compensate for any axial play present between them and the parts 2,3 to be joined together, for example owing to slightly different thicknesses, owing to the elasticity of said wings 10, causing them to flex slightly more or slightly less after they have unfolded into the extended configuration at the end of introduction of the box-like element 5,5c into the perforations 4.

All the objects of the invention are therefore achieved.

The invention claimed is:

1. A retaining device (1; 1b), for connecting together vehicle body parts (2,3) provided with a through-perforation (4), characterized in that the retaining device comprises:
   i)—a box-like element (5;5c) which is designed to be inserted so as to pass through the perforation of the parts to be connected and has a first end (6) directed in a direction (D) for introducing during use the retaining device inside the through-perforation of the parts to be connected, and a second end (7), opposite to the first end;
   (ii)—a pivot (8;8b;8c) mounted inside the box-like element (5;5c) rotatably about its axis of symmetry (A) and provided with a head (9) arranged on the outside of the box-like element, at the second end (7) of the box-like element; and
   iii)—a pair of elastically deformable wings (10) mounted in an angularly integral manner on the pivot (8;8b;8c) and extending longitudinally in a direction parallel to the axis (A) of the pivot, from which they project on opposite sides transversely jutting out; the wings (10) being configured so as to be able to assume: an undeformed or extended configuration, in which they have an L shape in a plane perpendicular to the axis (A) of symmetry of the pivot and project radially jutting out from the box-like element (5;5c) through a pair of opposite through-windows (11) formed through a side wall (12) of the box-like element; and an elastically deformed or retracted configuration in which they are fully folded up inside the box-like element (5;5c) assuming a U-shaped form in a plane perpendicular to the axis (A) of symmetry of the pivot;
   iv)—the pivot (8;8b;8c) being selectively rotatable between a first and a second angular position; in the first angular position the wings (10) being situated facing the pair of opposite through-windows (11) of the box-like element and in the second angular position the wings 10 cooperating making contact with the side wall (12) of the box-like element so as to be forced to assume the deformed or retracted configuration;
   v)—the wings (10) being configured so as to snap-engage, when the pivot (8;8b;8c) is in the first angular position, with the through-perforations (4) of the parts to be connected so as to clamp them together between the pivot head (9) and respective transversal rims (13) of the wings directed towards the second end (7) of the box-like element.

2. The retaining device according to claim 1, characterized in that the wings (10) form part of single metallic element (14;14b) which is elastically deformable and mounted in an angularly integral manner on the pivot (8;8b) and made from a metal sheet cut and folded so as to assume an overall S-shaped form.

3. The retaining device according to claim 2, characterized in that the pivot (8) has a transverse slot (15) which extends longitudinally, parallel to the axis (A) of the pivot; the metallic elastic element (14) having a flat central portion (16) which connects the wings (10) together and which is engaged inside the transverse slot (15) of the pivot.

4. The retaining device according to claim 2, characterized in that the pivot (8b) has a prismatic shape; the metallic elastic element (14b) having a central portion (16b) which connects the wings (10) together and which is configured as a radially deformable elastic prismatic sleeve which is fitted with interference onto the prismatic pivot (8b).

5. The retaining device according to claim 4, characterized in that the central portion (16b) of the metallic elastic element (14b) comprises a pair of first straps (18) which are folded in an L shape radially externally on a same first side (19) of the metallic elastic element and defining first and second opposite axial ends (20,21) of the central portion (16b) of the metallic elastic element; and a second strap (22) folded in an L shape radially externally on a second side (23) of the metallic elastic element opposite to the first side and arranged axially between the first straps (18).

6. The retaining device according to claim 1, characterized in that the wings (10) are formed integrally as one piece with the pivot (8c), preferably by means of moulding from a synthetic plastic material and are configured as a lamina; the box-like element (5c) being provided at its second end (7) with a quadrangular aperture (32) for introducing the pivot (8c) into the box-like element (5c); a perimetral edge (33) of the quadrangular aperture (32) being designed to cooperate with the wings (10), during introduction of the pivot (8c) into the box-like element (5c), so as to cause folding up thereof in the deformed or retracted configuration.

7. The retaining device according to claim 1, characterized in that the wings (10) are provided with opposite longitudinal rims (42) directed towards the first end (6) of the box-like element and arranged obliquely with respect to the axis of symmetry (A) of the pivot so as to converge towards the axis at the first end (6) of the box-like element; the longitudinal rims (42) being designed so as to be able to cooperate, during use, with the through-perforations (4) of the parts to be connected so as to cause, during insertion of the box-like element (5;5c) into the perforations, folding up of the wings (10) inside the box-like element and through the through-windows (11), towards the elastically deformed or retracted configuration.

8. The retaining device according to claim 7, characterized in that the longitudinal rims (42) of the wings (10) are folded in an L-shape in opposite circumferential directions; and in that the transversal rims (13) of the wings connect the longitudinal rims (42) to the pivot (8;8b;8c) and are each provided with a flap (43) folded in an L shape on the same side as the longitudinal rim (42) of the said wing, the flap (43) being designed to cooperate making bearing contact, during use, with a perimetral edge of the through-perforations (4) of the parts to be joined together.

9. The retaining device according to claim 1, characterized in that the box-like element (5;5c) is provided, at each through-window (11) and in the region of the second end (7), with a lateral tooth (24) designed to cooperate by means of snap-engagement, during rotation of the pivot (8;8b;8c) towards the second angular position, with a corresponding wing (10) as the latter moves towards the deformed or retracted configuration so as to lock by means of snap-engagement the pivot in the second angular position; the lateral teeth (24) being designed to allow the disengagement of the wings (10) when the pivot (8;8*b*;8*c*) is rotated in the opposite direction towards the first angular position; the box-like element (5;5*c*) being further provided at the first and second ends with a first through-hole (26) and second through-hole (27;32), respectively, coaxial with the axis (A) of the pivot; the second hole (27;32) being designed to allow the introduction of the pivot (8;8*b*;8*c*) and the wings (10) into the box-like element (5;5*c*) through the second end (7) and the first hole (26) cooperating with an end of the pivot opposite to the head (9) so as to guide, during use, the rotation thereof about the axis (A) of the pivot; the second hole (27;32) being further provided with circumferential projecting parts (29) designed to snap-engage with radial play inside an annular groove (30) of the pivot formed in the region of the head (9) of the pivot so as to lock by means of snap-engagement the pivot rotatably inside the box-like element; the second end (7) of the box-like element being further provided with a radially projecting flange (31) arranged facing and in contact with the head (9) of the pivot.

10. The retaining device according to claim 1, characterized in that the head (9) of the pivot and/or the flange (31) of the box-like element are provided with respective sealing gaskets (34;35) designed to enable the device to close off in a fluid-tight manner the through-perforation (4) of the body parts to be joined together; the box-like element (5;5*c*) being prismatic and having respective rims (39) parallel to the axis of the pivot which are lined, at least along a stretch (40) arranged in the region of the second end (7), with elastomeric pads (41).

11. A retaining device for connecting together parts provided with aligned through-perforations, comprising:
  i)—a box-like element having a first end facing in a first direction, and a second end, opposite to the first end;
  (ii)—a pivot mounted inside the box-like element rotatably about an axis of symmetry and provided with a head arranged on the outside of the box-like element, at the second end of the box-like element; and
  iii)—a pair of elastically deformable wings mounted in an angularly integral manner on the pivot and extending longitudinally in a direction parallel to the axis of symmetry of the pivot, and projecting on opposite sides transversely jutting out; each wing being configured so as to be able to assume:
  (a) an undeformed or extended configuration, in which the wing has an L shape in a plane perpendicular to the axis of symmetry of the pivot and projects radially jutting out from the box-like element through a corresponding through-window formed through a side wall of the box-like element, and
  (b) an elastically deformed or retracted configuration in which the wing is fully folded up inside the box-like element and assumes a U-shaped form in a plane perpendicular to the axis of symmetry of the pivot;
  iv)—the pivot being selectively rotatable between a first angular position and a second angular position; in the first angular position each wing being situated facing its corresponding through-window of the box-like element and in the second angular position each wing makes contact with the side wall of the box-like element so as to be forced to assume the deformed or retracted configuration;
  v)—each wing being configured so as to snap-engage, when the pivot is in the first angular position, with the through-perforations of the parts to be connected so as to clamp them together between the pivot head and a respective transversal rim of the wing directed towards the second end of the box-like element.

12. The retaining device of claim 11, wherein the wings form part of single metallic element which is elastically deformable and mounted in an angularly integral manner on the pivot and made from a metal sheet cut and folded so as to assume an overall S-shaped form.

13. The retaining device of claim 12, wherein the pivot has a transverse slot that extends longitudinally, parallel to the axis of symmetry of the pivot; the metallic elastic element having a flat central portion that connects the wings together and that is engaged inside the transverse slot of the pivot.

* * * * *